(12) United States Patent  
Rekimoto et al.

(10) Patent No.: US 7,230,605 B2
(45) Date of Patent: Jun. 12, 2007

(54) INFORMATION PROCESSING TERMINAL

(75) Inventors: Junichi Rekimoto, Tokyo (JP); Shigeru Tajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 10/250,879

(22) PCT Filed: Jan. 7, 2002

(86) PCT No.: PCT/JP02/00008

§ 371 (c)(1),
(2), (4) Date: Jul. 10, 2003

(87) PCT Pub. No.: WO02/056165

PCT Pub. Date: Jul. 18, 2002

(65) Prior Publication Data

US 2004/0100441 A1    May 27, 2004

(30) Foreign Application Priority Data

Jan. 10, 2001   (JP) .............................. 2001-002276

(51) Int. Cl.
   *G09G 5/08*   (2006.01)
(52) U.S. Cl. ........................ 345/158; 345/156; 345/161
(58) Field of Classification Search ................ 345/158, 345/169, 156; 715/701, 702; 173/516; 273/148; 463/46, 47, 147, 38; 340/425.5
   See application file for complete search history.

(56) References Cited

U.S. PATENT DOCUMENTS 5,453,758 A   9/1995  Sato 6,369,794 B1 *  4/2002  Sakurai et al. .............. 345/156
6,438,393 B1 *  8/2002  Suuronen .................. 455/575.1
6,641,480 B2 * 11/2003  Murzanski et al. ........... 463/38

FOREIGN PATENT DOCUMENTS

| EP | 0930768   | 7/1999  |
| JP | 02-105919 | 4/1990  |
| JP | 06-43742  | 6/1994  |
| JP | 06-81035  | 11/1994 |
| JP | 07-44315  | 2/1995  |
| JP | 10-63411  | 3/1998  |
| JP | 10-124178 | 5/1998  |
| WO | WO98/39906 | 9/1998 |

* cited by examiner

*Primary Examiner*—Jimmy H. Nguyen
*Assistant Examiner*—Tammy Pham
(74) *Attorney, Agent, or Firm*—Sonnenschein Nath & Rosenthal LLP

(57) ABSTRACT

The present invention relates to an information processing terminal that makes it possible to implement a more preferable user interface. A user can input various processes by inclining a PDA (Personal Digital Assistants) 1, while depressing a control button 14. For example, when a menu screen for selecting application programs is displayed on a display section, the user moves a cursor by inclining the PDA 1 to select an application program for execution. The PDA 1 generates a clicking feel (feedback) to the user every time it moves the cursor. The present invention is applicable to portable information terminals such as PDAs, and various remote controllers for televisions, game machines and the like.

13 Claims, 18 Drawing Sheets

INFORMATION PROCESSING TERMINAL

CROSS REFERENCE TO RELATED APPLICATIONS

This application is a U.S. national stage application based on PCT/JP02/00008 filed on Jan. 7, 2002, which claims priority from Japanese Patent Application No. 2001-002276 filed on Jan. 10, 2001, all of which are incorporated herein by reference to the extent permitted by law.

BACKGROUND OF THE INVENTION

The present invention relates to an information processing terminal and particularly to an information processing terminal that makes it possible to implement a more preferable user interface by generating vibrations according to a predetermined displacement being detected.

In recent years, it has been proposed to input various processes by rotating or inclining the terminals, as a user interface for information processing terminals such as portable phones and PDAs (Personal Digital Assistants).

For example, when a menu screen for application programs is displayed on a terminal, it is arranged such that a cursor on the screen moves according to the user inclining the terminal, to enable the user to select a desired application program.

However, when the user moves the cursor by, for example, inclining the terminal, there has been a problem that manipulation is difficult as a fine inclination adjustment is required.

SUMMARY OF THE INVENTION

The present invention has been made in view of such circumstances, and it is intended to provide a user interface allowing simple and reliable input, in a terminal in which a cursor moves according to inclination and the like,.

An information processing terminal of the present invention is characterized by comprising: execution means for executing a predetermined process; displacement detection means for detecting a displacement of an attitude of a housing of the information processing terminal; and vibration generation means for generating vibrations to the housing when the displacement of the attitude detected by the displacement detection means has exceeded a predetermined value.

It may be designed to further comprise: display means for displaying a plurality of items of information; and display switching means for switching the information displayed by the display means in addition to the vibrations generated by the vibration generation means.

It may be designed to further comprise instruction means for instructing execution of the information switched by the display switching means, so that the execution means can execute a process corresponding to the information instructed by the instruction means.

It may be so designed that the displacement detection means detects a displacement of a rotation with respect to a predetermined axis of the housing.

It may be so designed that the display switching means displays the information displayed by the display means in an enlarged form or in a reduced form.

It may be so designed that the vibration generation means is provided so as to project from the housing, and generates the vibrations transmitted to a user's hand which touches the housing.

It may be so designed that the information processing terminal is an input device of another information processing apparatus, and further comprises transmission means for transmitting an instruction to the another information processing apparatus.

It may be designed to further comprise receiving means for receiving a signal from the another information processing apparatus, so that the vibration generation means can generate the vibrations to the housing according to the signal received by the receiving means.

An information processing method for an information processing terminal of the present invention is characterized by including: an execution step for executing a predetermined process; a displacement detection step for detecting a displacement of an attitude of a housing of the information processing terminal; and a vibration generation step for generating vibrations to the housing when the displacement of the attitude detected by processing of the displacement detection step has exceeded a predetermined value.

In the information processing terminal and method of the present invention, a predetermined process is executed to detect a displacement of the attitude of the housing of the information processing terminal. Further, when the displacement of the detected attitude has exceeded a predetermined value, vibrations are generated to the housing.

DETAILED DESCRIPTION OF THE PRESENTLY PREFERRED EMBODIMENTS

Figure 1:
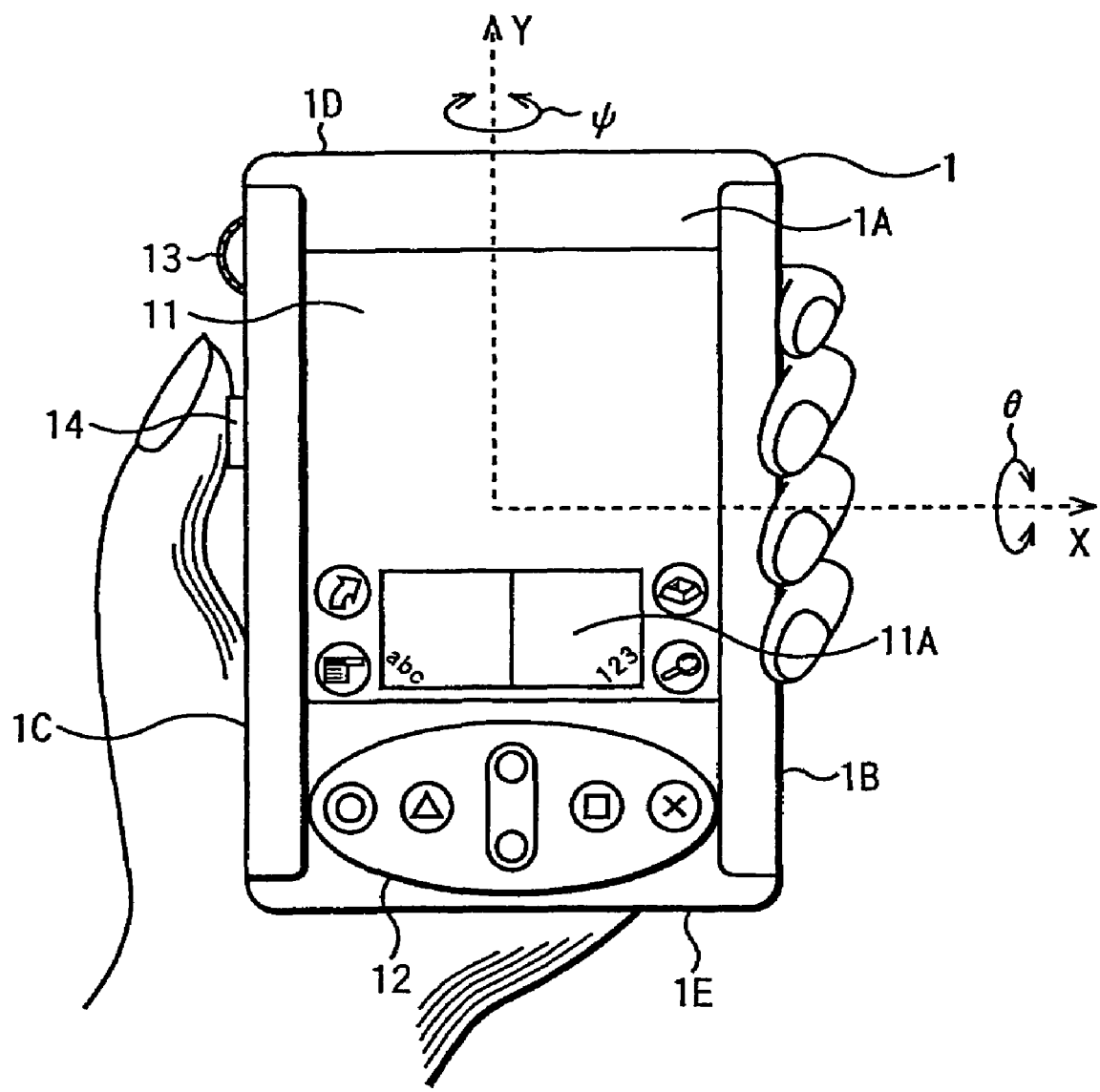
FIG. 1 is a diagram showing a frontal external configuration of a PDA to which the present invention is applied.
Figure 2:
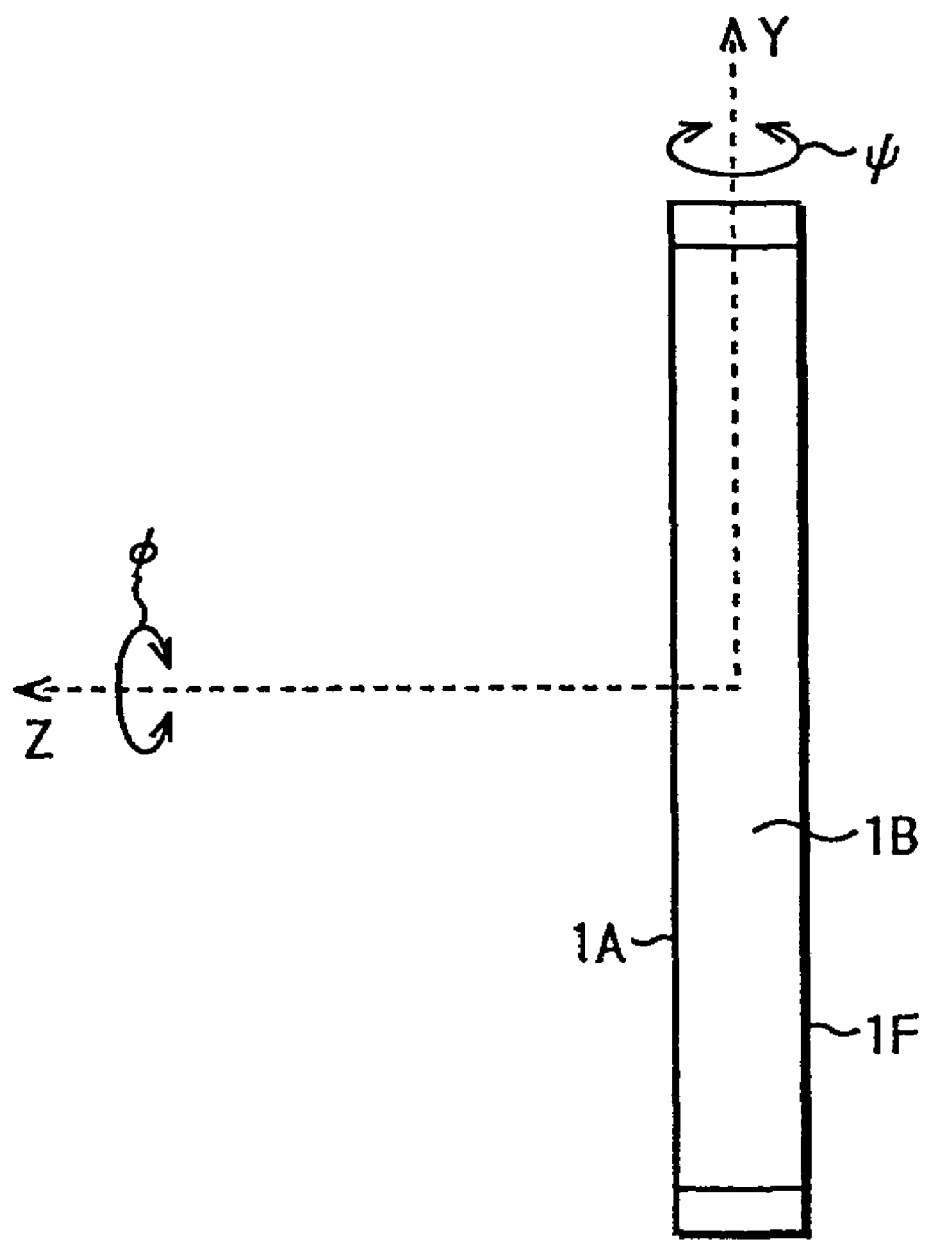
FIG. 2 is a diagram showing an external configuration of the right side surface of the PDA of FIG. 1.

FIG. 1 and FIG. 2 are diagrams respectively showing an example of an external configuration of a frontal external configuration (a surface 1A) and an example of an external configuration of the right side surface (a surface 1B) of a PDA 1, to which the present invention is applied, with the PDA 1 held by a user's left hand.

The PDA 1 has a housing thereof formed to a size permitting holding and manipulation with one hand, and a display section 11 is provided approximately on a central portion of the surface 1A.

The display section 11 is constituted by a display device such as an LCD (Liquid Crystal Display), and displays icons, thumbnails, text and the like.

The user inputs various commands to the icons and the like displayed on the display section 11 by manipulating a touch pad 11A, keys provided below the touch pad 11A, a jog dial 13 provided on a surface (left side surface) 1C and the like.

Further, the user depresses a control button 14 provided below the jog dial 13 on the surface 1C, toward the inside of the housing, and then, for example, inclines the PDA 1, whereby the user can input various processes. For example, when a menu screen for application programs stored in the PDA 1 is displayed on the display section 11, the user moves a cursor by inclining the PDA 1, to select an application program for execution.

Further, it is so designed that when the cursor is moved by, for example, inclining the PDA 1, vibrations are caused by the movement of the cursor, whereby the user can have a clicking feeling (a feedback from the user's input operation) as if the user were selecting an icon using an input device such as a mouse pointer.

Figure 3:
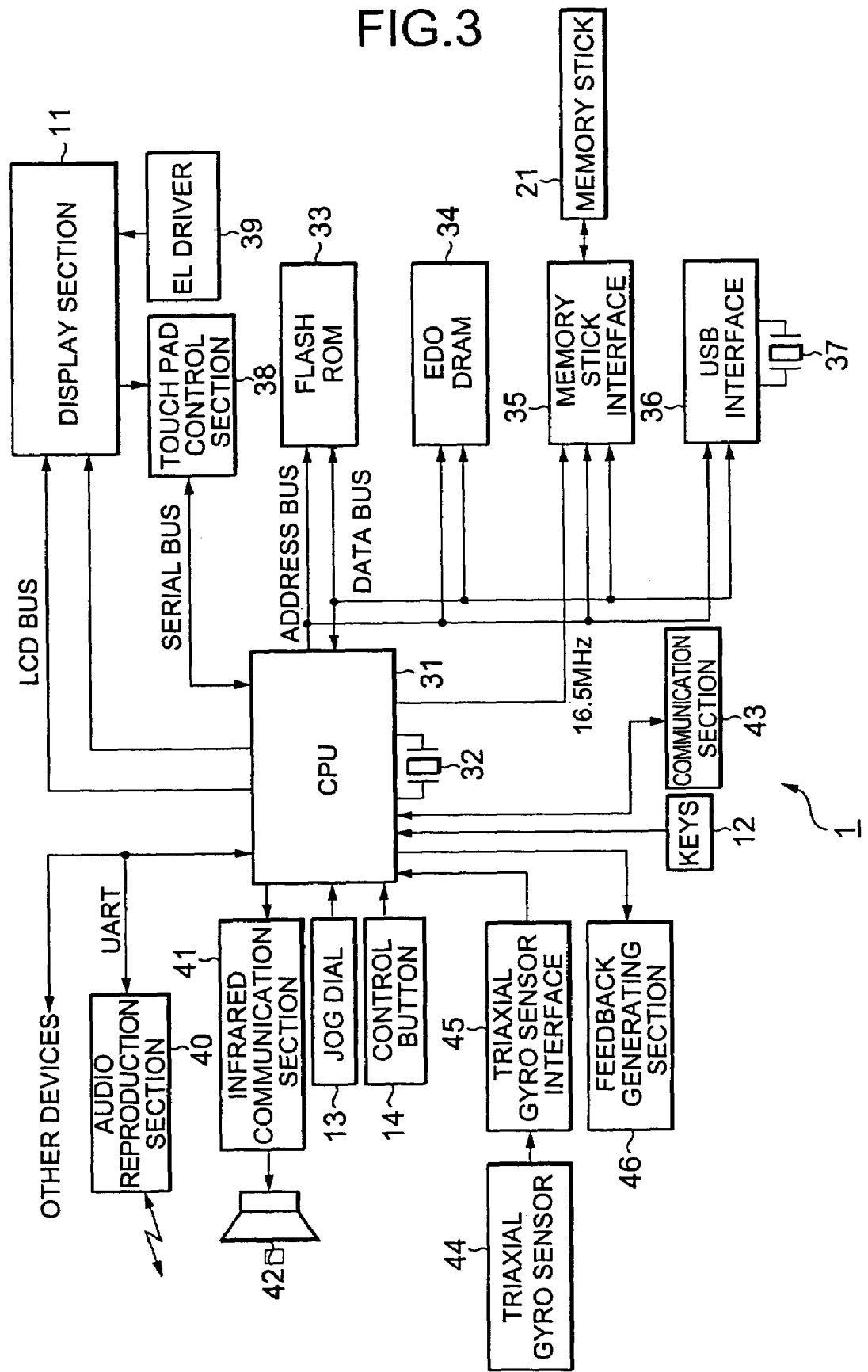
FIG. 3 is a block diagram showing an internal configuration of the PDA of FIG. 1.

FIG. 3 is a block diagram showing an example of an electrical configuration of the PDA 1. The parts corresponding to FIG. 1 are given the same reference numerals, and descriptions thereof will be omitted whenever appropriate.

A CPU (Central Processing Unit) 31 executes various programs, such as an operating system or application programs, loaded into a Flash ROM (Read Only Memory) 33, or EDO DRAM (Extended Data Out Dynamic Random-Access Memory) 34, in synchronism with a clock signal supplied from a oscillator 32.

The Flash ROM 33 is constituted by a flash memory, which is a kind of an EEPROM (Electrically Erasable Programmable Read-Only Memory), and generally loads basically fixed data among programs and operational parameters used by the CPU 31. The EDO DRAM 34 loads programs executed by the CPU 31, and parameters that properly change in their execution.

A memory stick interface 35 reads data from a memory stick (a trademark) 21 attached to the PDA 1, and writes data supplied from the CPU 31 to the memory stick 21.

The memory stick 21 is an electrically rewritable and erasable flash memory device housed in a small, thin plastic case, and can read and write various data, such as images, audio and music, via a 10-pin terminal.

A USB (Universal Serial Bus) interface 36 inputs data or programs from a USB device to which it is connected, and outputs data supplied from the CPU 31, in synchronism with a clock signal supplied from an oscillator 37.

The Flash Memory 33, the EDO DRAM 34, the memory stick interface 35 and the USB interface 36 are connected to the CPU 31 via an address bus and a data bus.

The display section 11 receives data from the CPU 31 via a LCD bus, and displays images, characters and the like corresponding to the received data. A touch pad control section 38 receives, when the touch pad 11A is manipulated, data corresponding to the manipulation (e.g., indicating the coordinates touched) from the display section 11, and supplies a signal corresponding to the received data to the CPU 31 via a serial bus.

An EL (Electroluminescence) driver 39 operates electroluminescent elements provided on the back of the liquid crystal display section of the display section 11 to control the brightness of display on the display section 11.

An infrared communication section 40 transmits data received from the CPU 31 via a UART (Universal Asynchronous Receiver-Transmitter) to not shown other devices as an infrared signal, and receives infrared signals transmitted from the other devices for supply to the CPU 31. As a result, the PDA 1 can communicate with the other devices multi-directionally via the UART.

An audio reproduction section 41 is constituted by decoding circuitry and the like for data on audio to decode data on audio stored beforehand or data on audio received from the other devices for reproduction and output of the audio. For example, the audio reproduction section 41 reproduces data on audio supplied from the CPU 31, for output of the audio corresponding to the data from speakers 42 via a built-in buffer.

A communication section 31 connects to the Internet and the like via a communication cable and the like, accommodates data (such as e-mail) supplied from the CPU 31 to a packet of predetermined format for transmission to the other devices. Further, the communication section 43 outputs the packetized data or programs transmitted from the other devices to the CPU 31.

Figure 4:
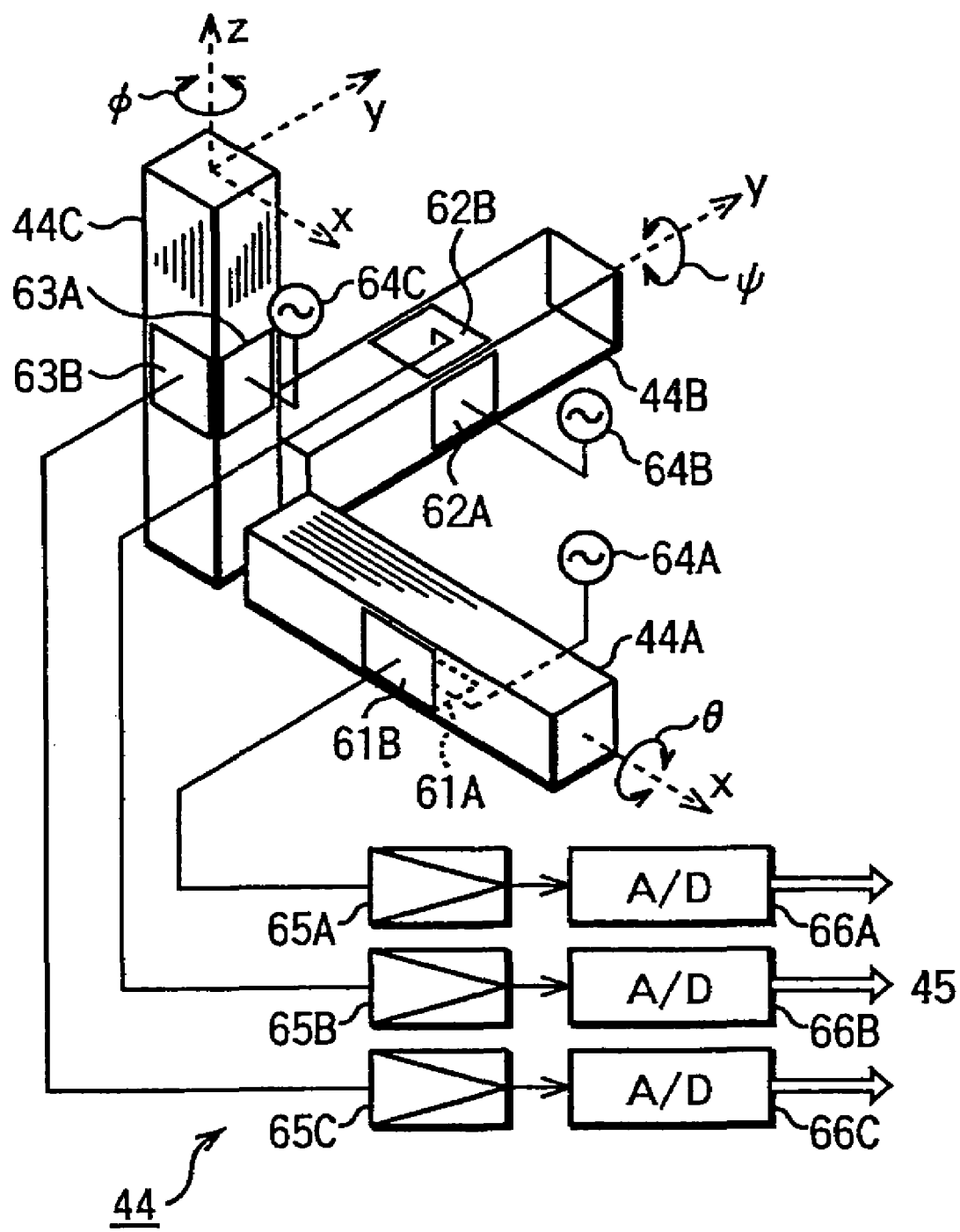
FIG. 4 is a diagram showing an exemplary configuration of a triaxial gyro sensor of FIG. 3.

An output of a triaxial gyro sensor 44 is input to the CPU 31 via a triaxial gyro sensor interface 45. The triaxial gyro sensor 44 has a configuration such as shown in, for example, FIG. 4.

The triaxial gyro sensor 44 is constituted by vibratory gyros 44A, 44B, 44C that detect rotational angular velocities occurring at X, Y, Z coordinate axes, respectively. As shown in FIG. 1, the X-axis extends in a direction perpendicular to the surface 1B, and the Y-axis extends in a direction perpendicular to a surface 1D (upper surface) of the PDA 1. As shown in FIG. 2, the Z-axis extends in a direction perpendicular to the surface 1A.

The vibratory gyros 44A to 44C utilize properties that when a rotational angular velocity is applied to a vibrating object, a Coriolis force is generated in a direction perpendicular to the vibration (Coriolis effect), and this Coriolis force is represented as follows.

$$F = 2\,mv\omega$$

(where m is the mass; v is the velocity; and $\omega$ is the angular velocity).

Therefore, the angular velocity $\omega$ is proportional to the Coriolis force F, and thus the rotational angular velocity can be detected by detecting the Coriolis force.

The vibratory gyro 44A is provided with a driving piezoceramic element 61A and a detecting piezoceramic element 61B, and an ac signal as an oscillation output of an oscillator 64A is applied to the driving piezoceramic element 61A. In this state, when a rotation is applied around the X-axis, a Coriolis force is applied to the detecting piezoceramic element 61B, to generate a voltage E.

The minute voltage E output from the detecting piezoceramic element 61B is amplified by an amplifier 65A, and converted into digital data by an A/D converter 66A.

The converted digital data is notified to the CPU 31 via the triaxial gyro sensor interface 45.

Note that the angular velocity ω applied to the vibratory gyro 44A and the generated voltage E have a proportional relationship with each other, and that it is set such that, for example, when a rightward rotation is applied around the X-axis toward the intersection (origin) where the X-axis, the Y-axis, the Z-axis cross, the voltage E increases, whereas when a leftward rotation is applied, the voltage E decreases. As a result, the direction and magnitude of the angular velocity applied to the X-axis is detected.

The vibratory gyros 44B, 44C each have a basically similar configuration to that of the vibratory gyro 44A. That is, an angular velocity occurring around the Y-axis is detected by the vibratory gyro 44B, amplified by an amplifier 65B, and thereafter converted into digital data by an A/D converter 66B. Further, an angular velocity occurring around the Z-axis is detected by the vibratory gyro 44C, amplified by an amplifier 65C, and thereafter converted into digital data by an A/D converter 66C.

The digital data converted by the A/D converter 66B or 66C is notified to the CPU 31 via the triaxial gyro sensor interface 45 similar to the digital data on the angular velocity occurring around the X-axis, detected by the vibratory gyro 44A.

Figure 5:
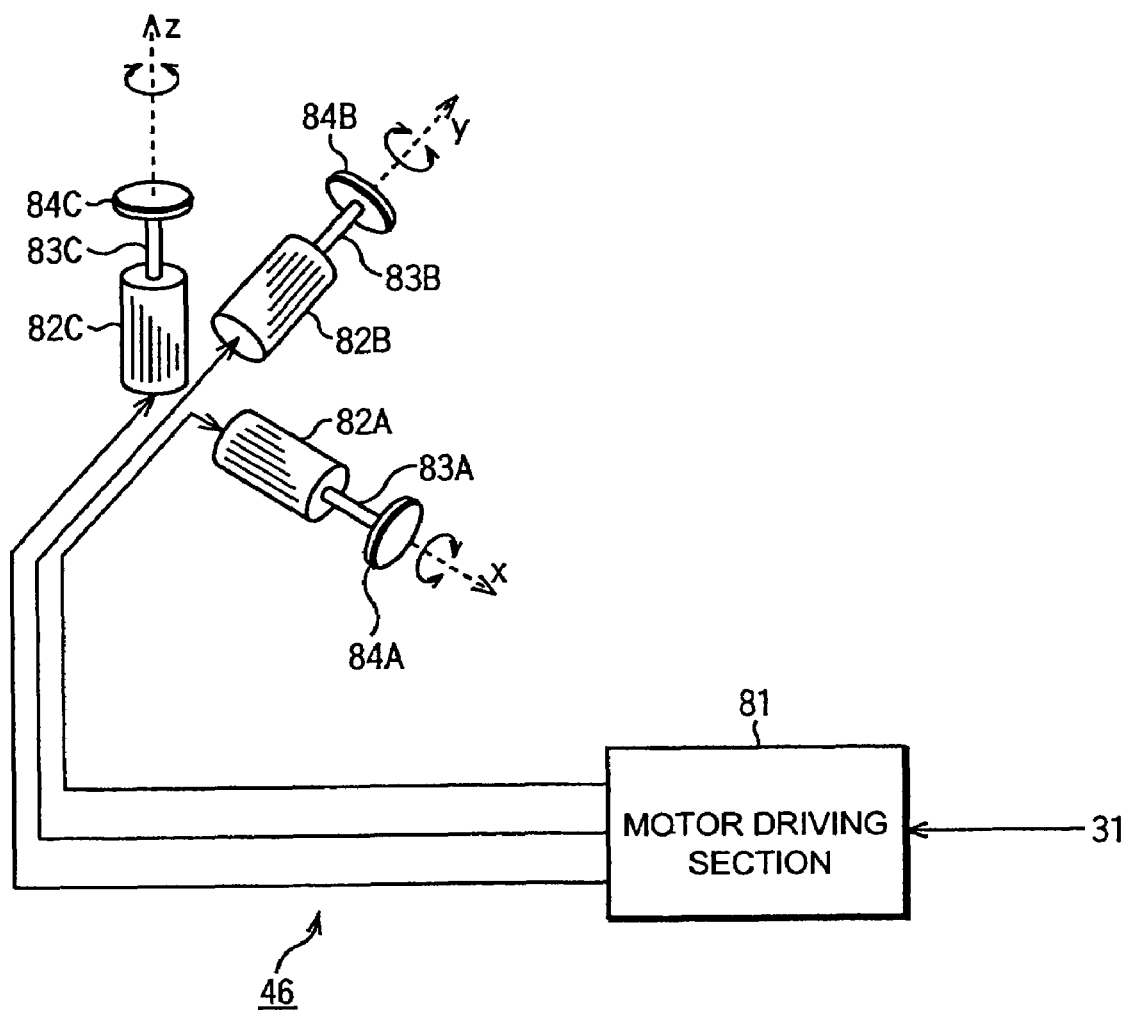
FIG. 5 is a diagram showing an exemplary configuration of a feedback generating section of FIG. 3.

The CPU 31 controls a feedback generating section 46. This feedback generating section 46 has a configuration as shown in FIG. 5. The feedback generating section 46 is constituted basically by spindles 84A to 84C that generate feedbacks, motors 82A to 82C that rotate them, respectively, and a motor driving section 81 that applies voltages to the motors 82A to 82C, respectively.

The motor driving section 81 applies a voltage to the motor 82A based on an instruction from the CPU 31, to rotate the spindle 84A in such a direction as to cancel the angular velocity having occurred around the X-axis, detected by the vibratory gyro 44A.

Further, the motor driving section 81 applies voltages to the motors 82B and 82C similarly to drive the respective spindles 84B and 84C in such directions as to cancel the angular velocities detected by the vibratory gyros 44B and 44C.

In response to detection of angular velocities equal to or above a predetermined threshold, the CPU 31 moves the cursor displayed on the display section 11 and drives the spindles 84A to 84C rapidly only for a predetermined period of time, and thereafter stops them rapidly. As a result, the user holding the PDA 1 can feel a feedback, such as a clicking feel, from each cursor movement made by inclining the PDA 1.

Figure 6:
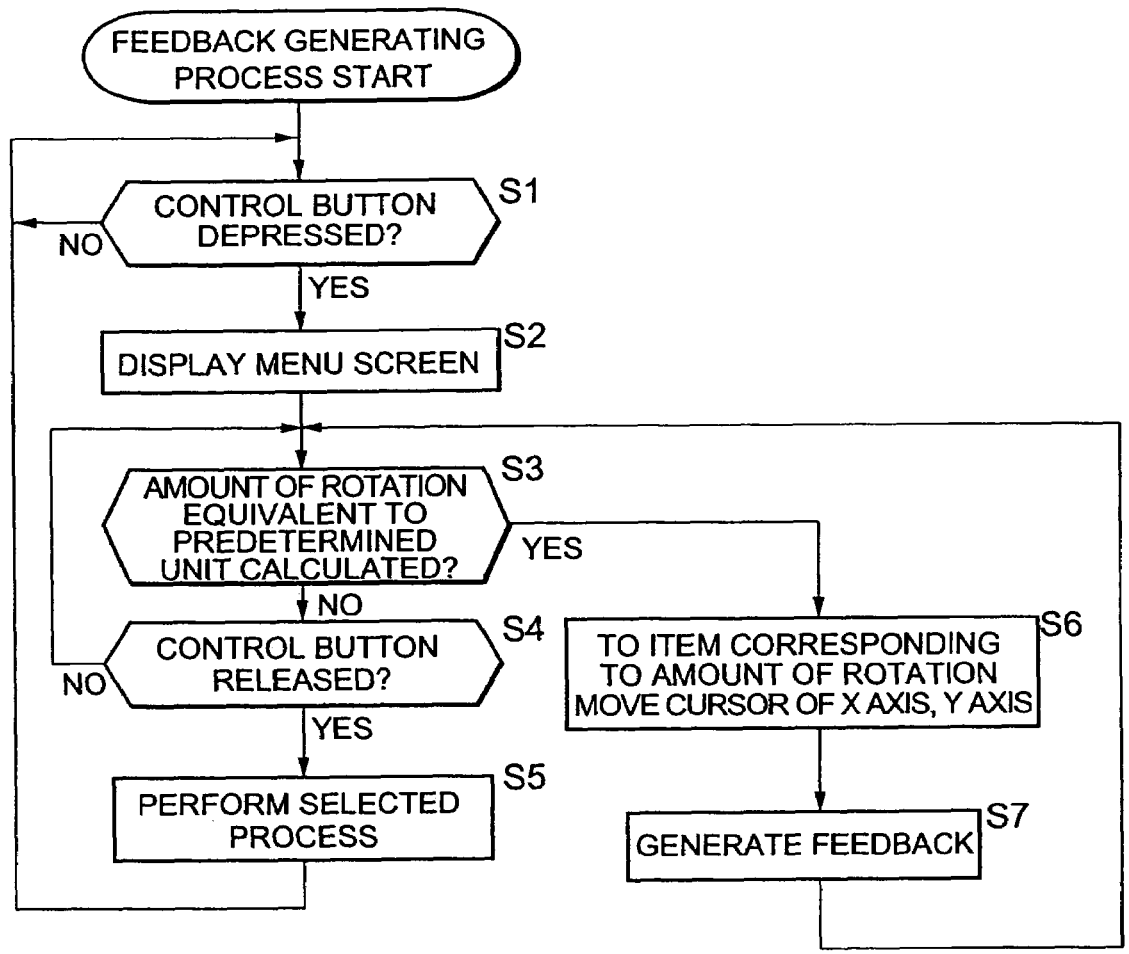
FIG. 6 is a flowchart illustrating a process of the PDA of FIG. 1.

Next, referring to a flowchart shown in FIG. 6, a feedback generating process of the PDA 1 will be described, which is generated when the user manipulates the PDA 1 by inclination. Further, in the description, exemplary displays on the display section 11 shown in FIG. 7 to FIG. 10 will be referred to whenever appropriate.

In step S1, the CPU 31 determines whether or not the control button 14 has been depressed, and waits until it determines that the button has been depressed. In the PDA 1, the user can move the cursor by inclining the PDA 1, while depressing the control button 14.

If having determined that the control button 14 has been depressed, the CPU 31 goes to step S2 to display a menu screen for selecting application programs stored in the Flash ROM 33 and the like, on the display section 11.

Figure 7:
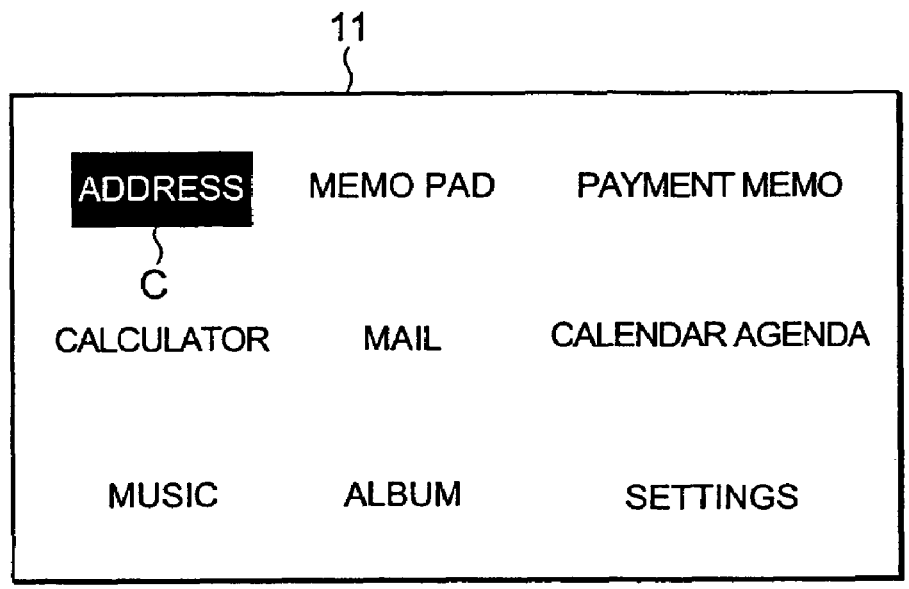
FIG. 7 is a diagram showing an exemplary display on a display section of the PDA of FIG. 1.

FIG. 7 is a diagram showing an example of the menu screen for selecting application programs, which the CPU 31 causes the display section 11 to display thereon.

In this example, displayed are an "Address icon" manipulated when an address program is executed, a "Memo Pad icon" manipulated when a memo pad program is executed, a "Payment Memo icon" manipulated when a payment memo program is executed, a "Calculator icon" manipulated when a calculator program is executed, a "Mail icon" manipulated when a mail program is executed, an "Agenda icon" manipulated when an agenda program is executed, a "Music icon" manipulated when a music program is executed, an "Album icon" manipulated when an album program is executed and a "Settings icon" manipulated when a settings program is executed. Further, a cursor C for specifying a program is displayed on the "Address icon", and the user, by inclining the PDA 1, moves this cursor C to select a program for execution.

In step S3, the CPU 31 determines whether or not an amount of rotation equivalent to a predetermined unit has been calculated based on a notification from the triaxial gyro sensor 44. That is, the CPU 31 calculates an amount of rotation by multiplying an angular velocity notified from the triaxial gyro sensor 44 by a time during which the rotation is applied, to determine whether or not it has exceeded the amount of rotation equivalent to the predetermined unit.

If having determined that the amount of rotation equivalent to the predetermined unit is not calculated, the CPU 31 goes to step S4, to determine whether or not the control button 14 has been released.

If having determined that the control button 14 is not released, the CPU 31 returns to step S3, to repeat this and subsequent process.

On the other hand, if having determined in step S4 that the control button 14 has been released, the CPU 31 goes to step S5 to execute a selected process (application program). For example, when the control button 14 is released with the menu screen for selecting application programs being such as shown in FIG. 7, the CPU 31 recognizes that the address program has been selected, and thus loads and starts up the address program to the EDO DRAM 34.

After that, the process returns to step S1, to repeat this and the subsequent processing.

On the other hand, if having determined in step S3 that the amount of rotation equivalent to the predetermined unit has been calculated, the CPU 31 goes to step S6 to move the cursor C displayed on the display 11 according to the calculated amount of rotation produced around the X-axis and the Y-axis.

Further, simultaneously with moving the cursor C by the processing of step S6, the CPU 31 instructs the feedback generating section 46, in step S7, to generate a feedback by rotating the spindle 84A or 84B in such a direction as to cancel the calculated amount of rotation.

For example, with the cursor C indicating the "Address icon" as shown in FIG. 7, when the user inclines the PDA 1 by a predetermined angle in a direction of the surface 1B (right direction) around the Y-axis from the state (horizontal state) shown in FIG. 1, the CPU 31 determines, by the processing of step S3, that the amount of rotation equivalent to the predetermined unit has been calculated around the Y-axis based on the notification from the triaxial gyro sensor

Figure 8:
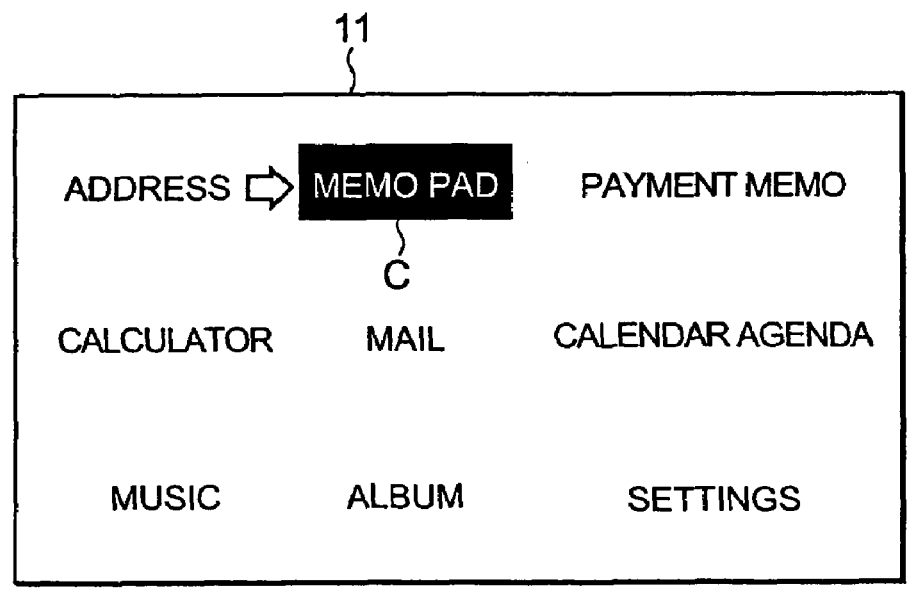
FIG. 8 is a diagram showing another exemplary display on the display section of the PDA of FIG. 1.

44, and moves the cursor C rightward by the processing of step S6, as in an exemplary display shown in FIG. 8.

In the exemplary display on the display section 11 of FIG. 8, the cursor C having specified the "Address icon" moves according to the amount of rotation produced around the Y-axis, to specify the "Memo Pad icon" which is one icon to the right. Further, the CPU 31 instructs the motor driving section 81 to rapidly drive the motor 82B in such a direction as to cancel the rotation applied (direction of the surface 1C in FIG. 1 (left direction)), by the processing of step S7. As a result, the user can feel the cursor C having moved right one icon not only with his or her sense of sight, but also with his or her sense of touch.

After that, the process returns to step S3, to repeat this and subsequent processing.

That is, every time it determines that the amount of rotation equal to or above the predetermined unit has been applied, the CPU 31 moves the cursor C in the corresponding direction, and generates a feedback together therewith, until the user releases the control button 14 to specify a process for execution as final.

Figure 9:
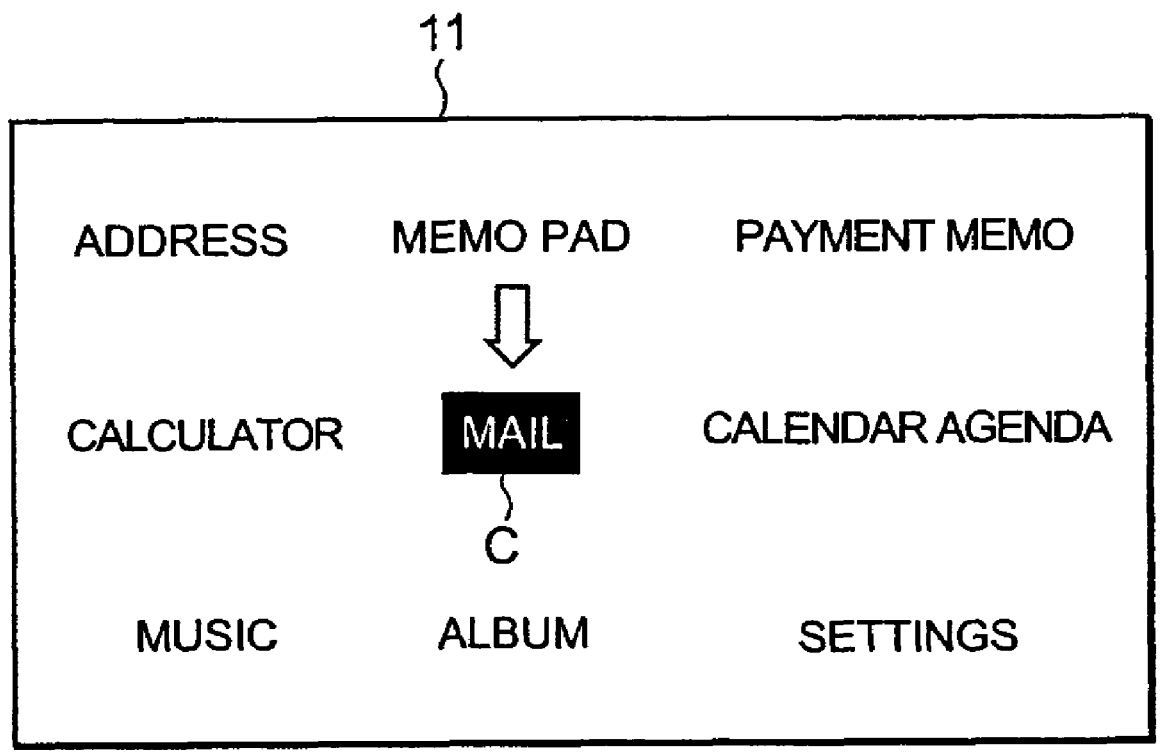
FIG. 9 is a diagram showing still another exemplary display on the display section of the PDA of FIG. 1.

FIG. 9 is a diagram showing movement of the cursor C made when, at a position of the cursor C shown in FIG. 8, a rotation is further applied to the X-axis by the user inclining the PDA 1 around the X-axis in a direction of a surface 1E (bottom surface) (downward direction) from the horizontal state shown in FIG. 1. That is, in that case, the CPU 31 moves the cursor C to the "Mailicon" from the "Memo Padicon" in step S6. Further, in step S7, the CPU 31 instructs the motor driving section 81 to drive the motor 82A in such a direction as to cancel the applied rotation (direction of the surface 1D (upper surface) (upward direction) in FIG. 1) to generate a feedback.

From the above process, the user can move the cursor C by inclining the PDA 1, and together therewith, can have clicking feels (a feedback), whereby the user can select processes for execution more reliably.

Further, it may also be so designed that feedbacks generated in the PDA 1 are generated by piezoelectric elements and the like, not by the rotations of the motors 84A to 84C.

Figure 10:
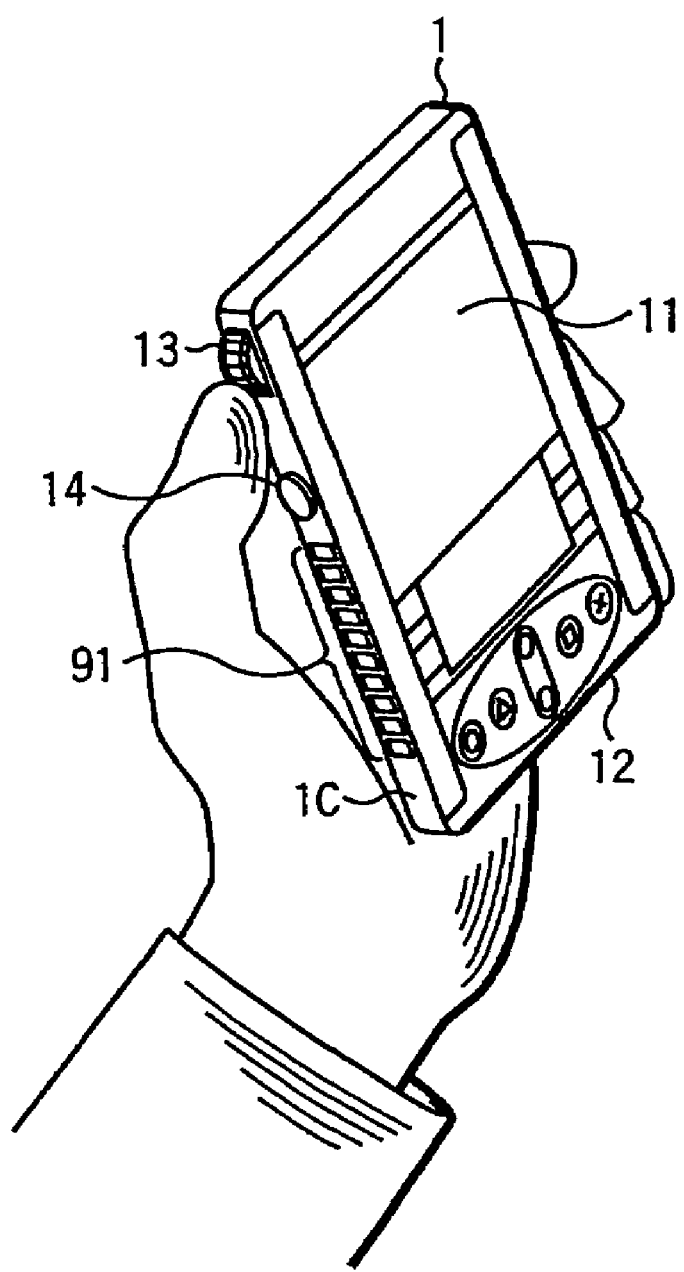
FIG. 10 is a diagram showing another external configuration of the PDA to which the present invention is applied.

FIG. 10 is a diagram showing an example of an external configuration of the PDA 1 in a case where piezoelectric elements 91 are arrayed on the surface 1C. Further, piezoelectric elements are similarly arrayed also on the surface 1B.

A piezoelectric element 91 is constituted by a ceramic having a high electromechanical coupling coefficient (e.g., PZT (lead zirconate titanate)), and is a thin, plate-like element that generates a displacement by instantly deforming in a thicknesswise direction (direction perpendicular to the surface 1B, 1C) when a voltage is applied thereto.

The displacement generated by each of the piezoelectric elements 91 is to be recognized by the user holding the PDA 1 as a sense of touch to his or her hand. The amount of displacement is set by adjusting the voltage applied to each piezoelectric element 91 or by adjusting the number of laminated layers of each piezoelectric element. Note that the surface of each piezoelectric element 91 is covered with a protective layer made of an acrylic resin and the like.

As a result, a clicking feel can be generated, and the user can feel a feedback. In that case, the feedback generating section 46 of FIG. 3 is constituted by the piezoelectric elements 91 and a piezoelectric element driving section that applies a voltage to each piezoelectric element 91. In this way, feedbacks can be generated by various methods.

While the feedbacks are generated by moving the cursor according to the amount of rotation produced around the X-axis and the Y-axis in the above, feedbacks can be generated according to various displacements applied to the PDA 1.

For example, the user may make an image be displayed on the display section 11 in enlarged form upon depressing the control button 14 and, with that position as a reference, moving the PDA 1 in a direction of the Z-axis (upward direction perpendicular to the sheet in FIG. 1). Further, reversely, the user can display an image displayed on the display section 11 in reduced form by moving the PDA 1 in a downward direction perpendicular to the sheet in FIG. 1. In that case, the CPU 31 generates a feedback every time it makes an enlarged or reduced display.

Further, when the selection menu screen is displayed as if the application programs were arranged on a drum, the user can select an application program by depressing the control button 14 and rotating the PDA 1 around the X-axis. In that case, a feedback is generated every time one application program switches to another.

Figure 11:
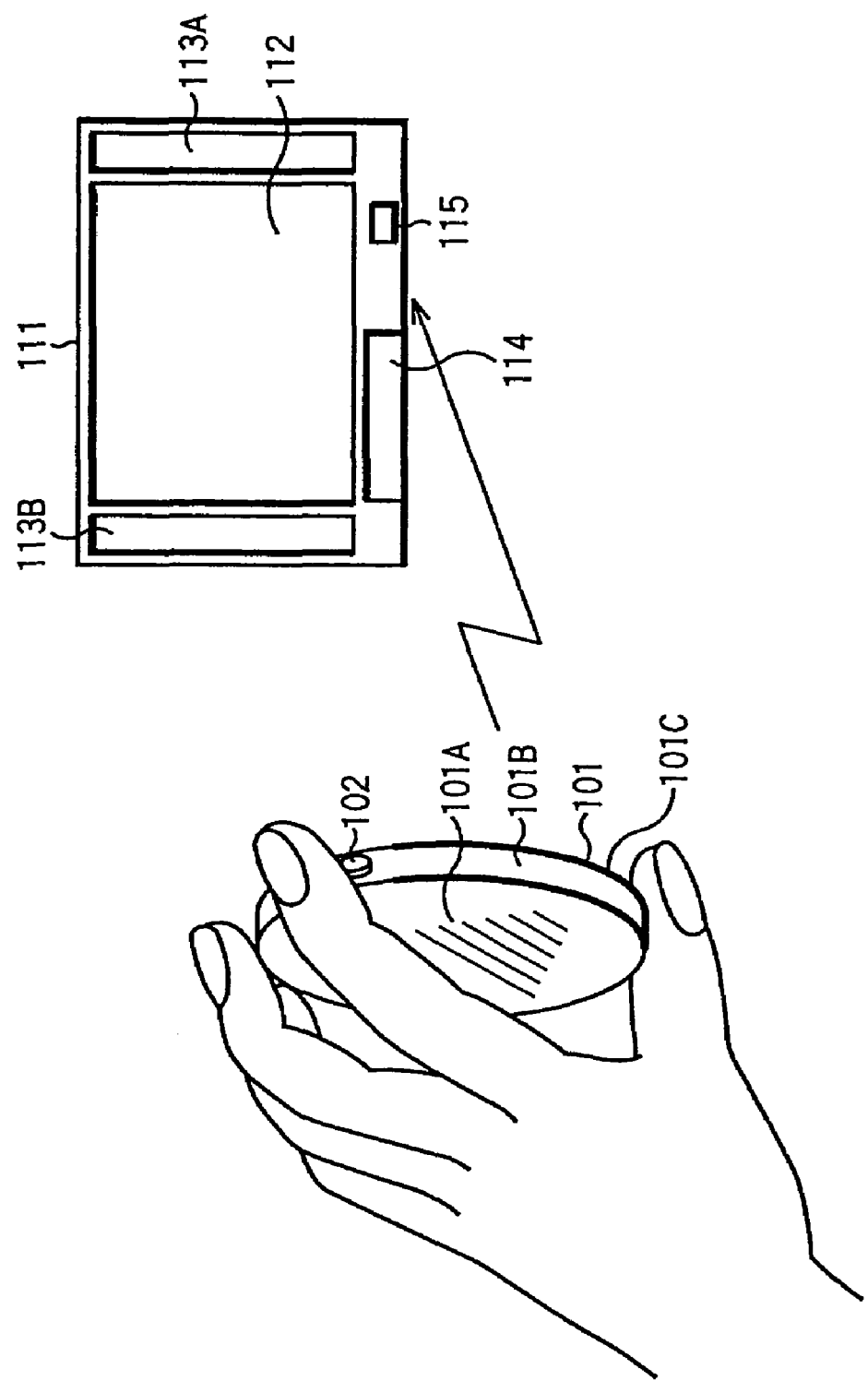
FIG. 11 is a diagram showing an external configuration of a remote controller to which the present invention is applied.

FIG. 11 is a diagram showing an exemplary configuration in a case where the present invention is applied to a remote controller 101 that manipulates a television 111 by an infrared signal.

The remote controller 101 has a disk-like housing, and various input buttons are arranged on a surface 101A and a surface 101B. Further, a surface 101C on the back of the surface 101A is provided with an infrared transmission section 124 (FIG. 12), to send out various processes input by the user to the television 111 as infrared signals.

A volume adjusting button 102 is arranged on the surface 101B (side surface), and the user can adjust the volume by rotating the remote controller 101 in a clockwise direction or a counterclockwise direction, while depressing the volume adjusting button 102 with the surface 101C (rear surface) facing the television 111.

Note that the television 111 is provided with a CRT 112 on the frontal external configuration thereof, speakers 113A and 113B on both sides thereof, and a control panel 114 and an infrared receiving section 115 below the CRT 112, respectively.

Figure 12:
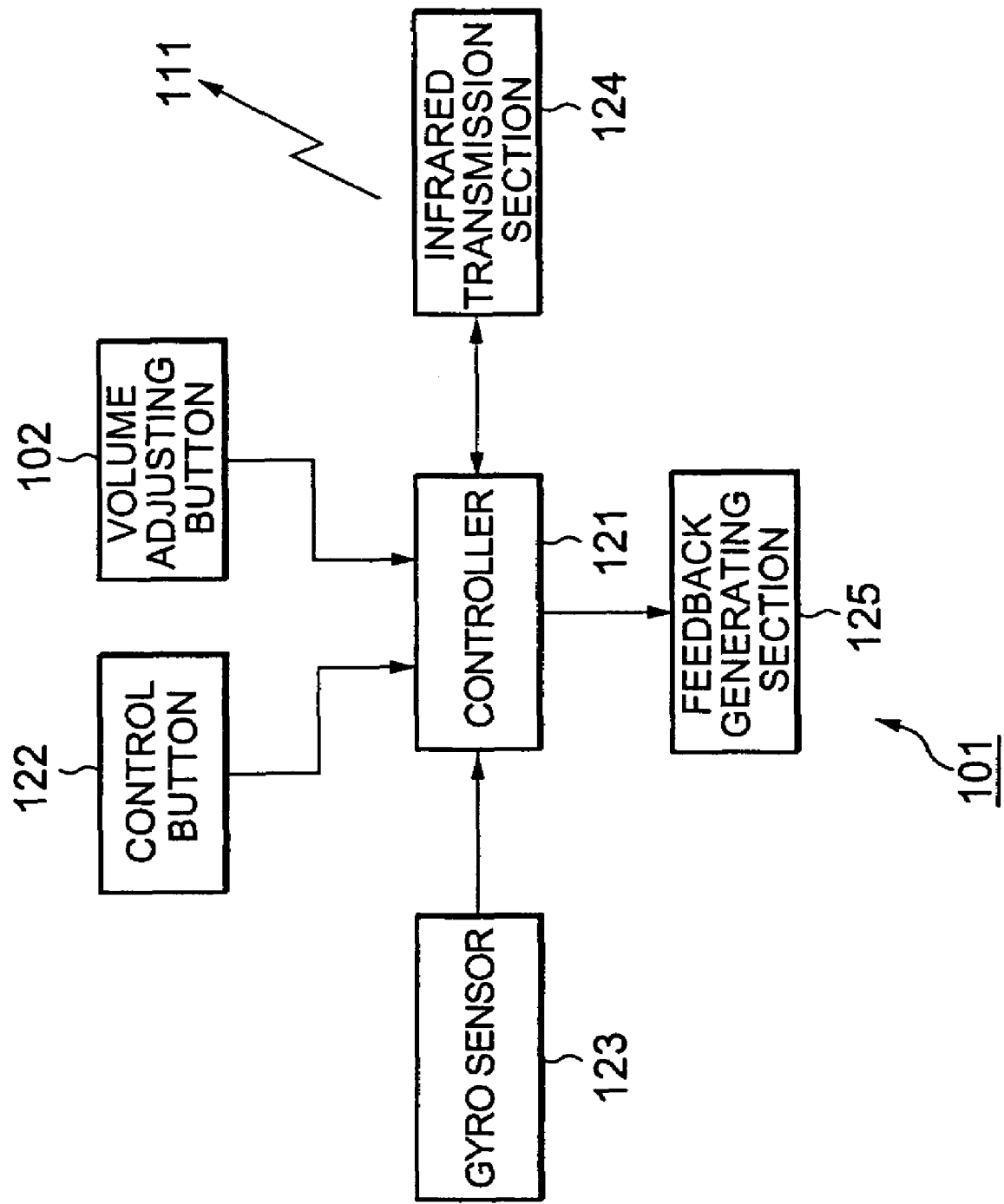
FIG. 12 is a block diagram showing an internal configuration of the remote controller of FIG. 11.

FIG. 12 is a block diagram showing an example of an internal configuration of the remote controller 101.

A controller 121 controls the overall operation of the remote controller 101, and performs a process thereof according to the user manipulating various buttons 122 and a volume adjusting button 102 provided on the remote controller 101.

A gyro sensor 123 detects an angular velocity occurring around an axis perpendicular to the surface 101A (front surface), for notification to the controller 121. The controller 121 calculates an amount of rotation applied to the remote controller 101 based on the notification.

An infrared transmission section 124 drives a light-emitting diode, not shown, based on an instruction from the controller 121 to send out an infrared signal to the television 111.

A feedback generating section 125 generates feedbacks to the user based on instructions from the controller 121. The feedback generating section 125 has a configuration such as an example shown in, for example, FIG. 13 and FIG. 14.

Figure 13:
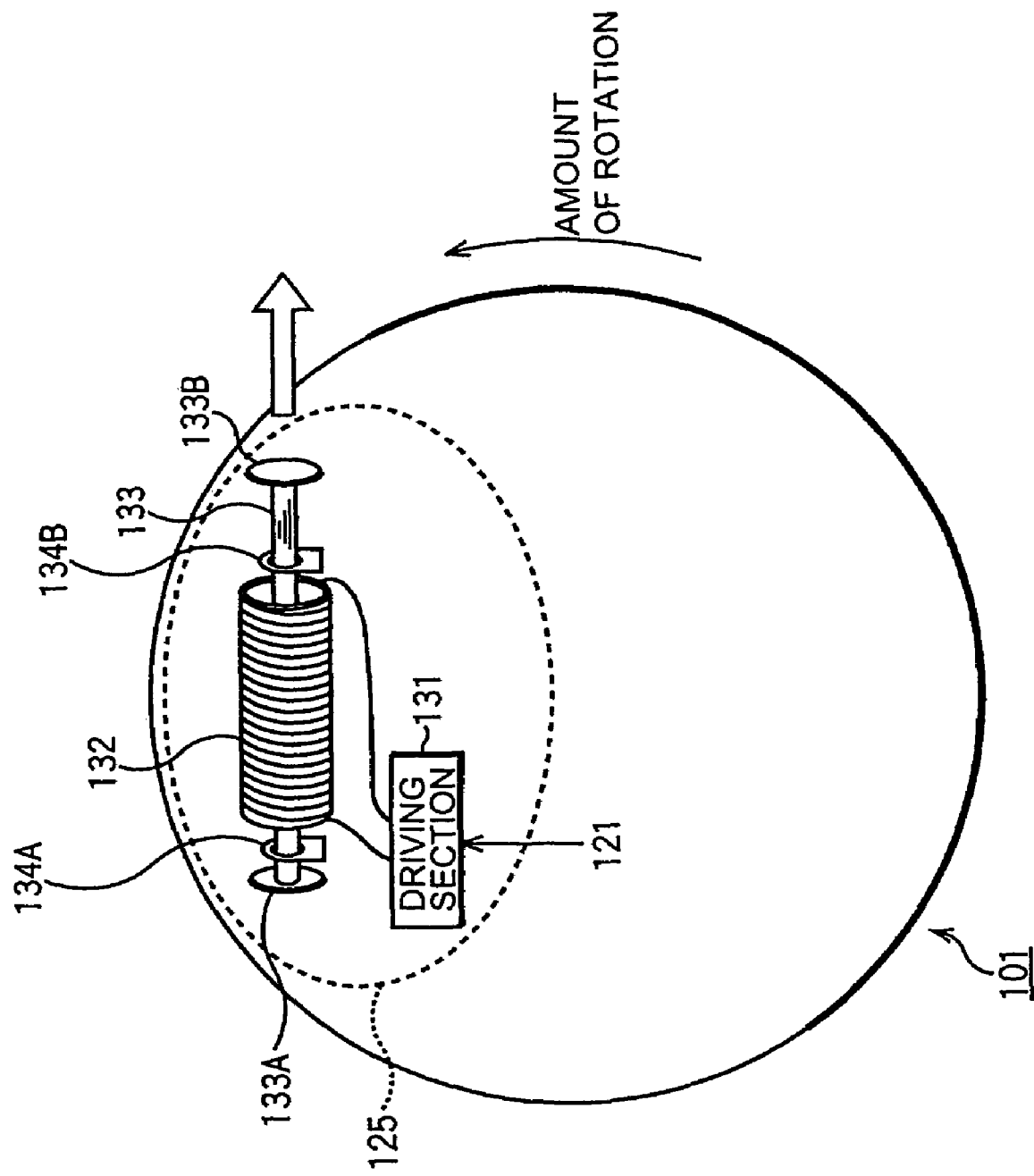
FIG. 13 is a diagram showing an exemplary configuration of a feedback generating section of FIG. 12.
Figure 14:
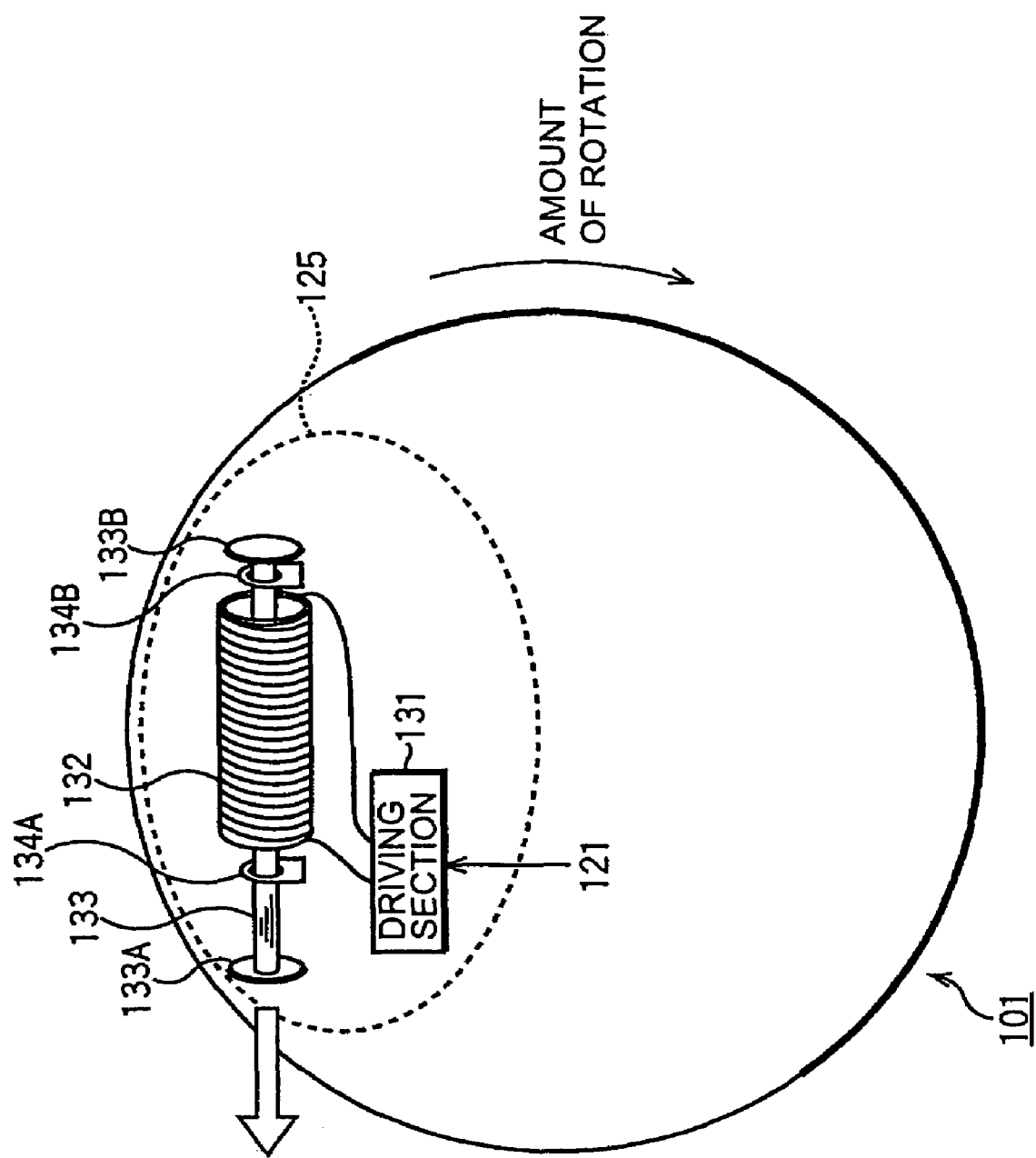
FIG. 14 is a diagram showing another exemplary configuration of the feedback generating section of FIG. 12.

In this example, as shown in FIG. 13 and FIG. 14, a hollow coil 132, stoppers 134A and 134B are secured to a board, not shown, and a shaft 133 is provided so as to be drivable therethrough in the left-right directions.

For example, as shown in FIG. 13, when a leftward (counterclockwise) rotation is applied and when the controller 121 has determined that it has exceeded a predetermined unit, the feedback generating section 125 drives the coil 132 so as to move the shaft 133 in such a direction as to cancel the rotation (rightward direction). As a result, a feedback to the user is generated when a protrusion 133A of the shaft 133 has collided with the stopper 134A.

Further, as shown in FIG. 14, when an amount of rotation equal to or above the predetermined unit is applied, reversely, in the direction rightwards (a clockwise direction), the feedback generating section 125 moves the shaft 133 in the left direction, causing a protrusion 133B thereof to collide with the stopper 134B to generate a feedback.

Note that a driving section 131 controls the direction of moving the shaft 133 by changing the polarity of a voltage applied to the coil 132, based on an instruction from the controller 121.

By such a configuration, a feedback generated by the feedback generating section 125 can be, for example, a feedback which is as if a user were rotating a volume control having a clicking function, provided on an audio system.

Figure 15:
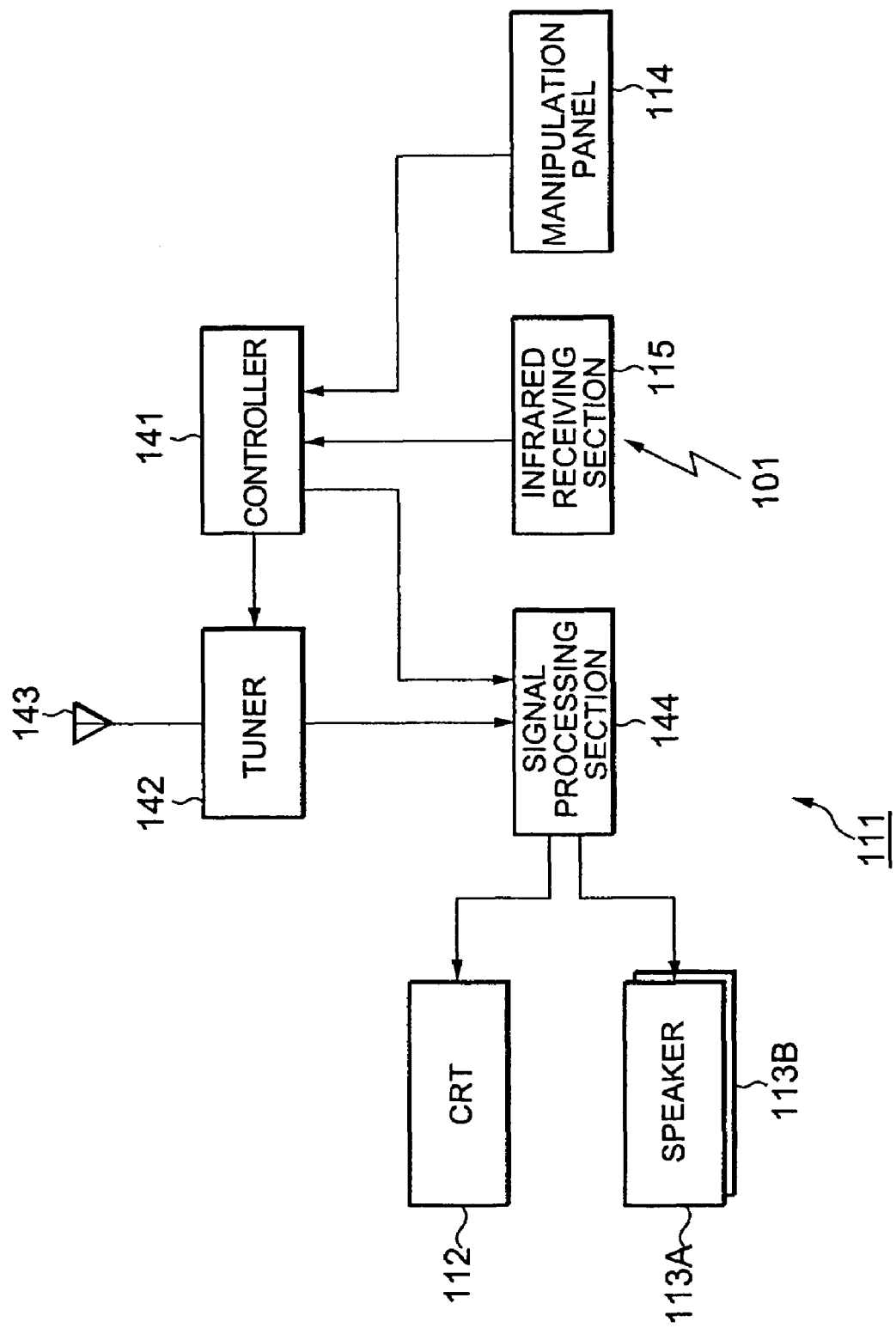
FIG. 15 is a block diagram showing an internal configuration of a television of FIG. 11.

FIG. 15 is a block diagram showing an example of an internal configuration of the television 111. The parts shown in FIG. 11 are given the same reference numerals.

A controller 141 controls the overall operation of the television 111 to perform various processes instructed by the user, by infrared signals received in an infrared receiving section 115 or a control panel 114.

A tuner 142 is controlled by the controller 121, and selects a signal of a channel which the user desires to view, from broadcast waves received by an antenna 143, for supply to a signal processing section 144.

The signal processing section 144 demodulates the signal supplied from the tuner 142, and outputs a video signal to the CRT 112 and an audio signal to the speakers 113A and 113B, respectively. Further, the signal processing section 144 is controlled by the controller 141, and displays, for example, an image, such as a volume indication, on the CRT 112.

Figure 16:
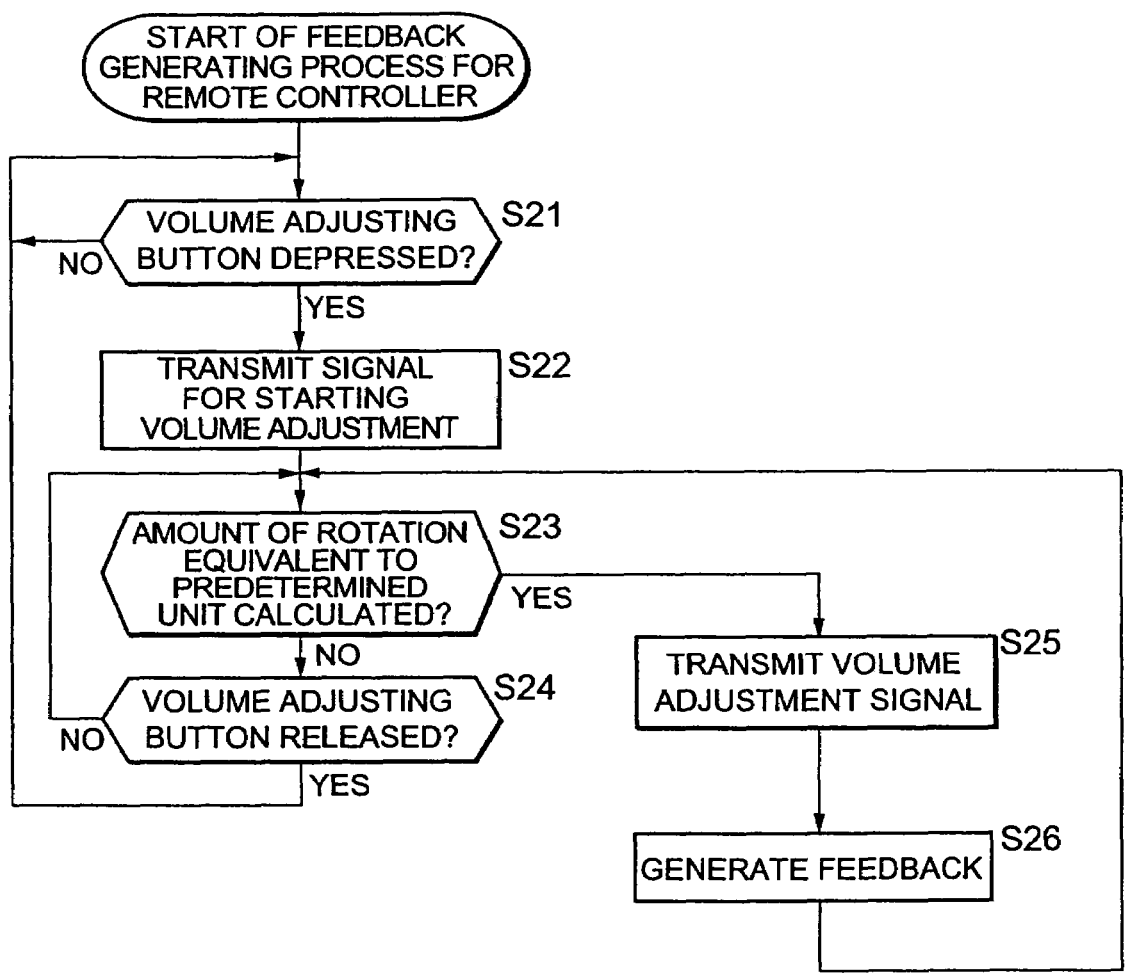
FIG. 16 is a flowchart illustrating a process of the remote controller of FIG. 11.

Next, referring to a flowchart of FIG. 16, a feedback generating process of the remote controller 101 will be described, which is performed when the user adjusts the volume.

In step S21, the controller 121 determines whether or not the volume adjusting button 102 provided on the surface 101B has been depressed, and waits until it determines that the button has been depressed.

If having determined that the volume adjusting button 102 has been depressed, the controller 121 goes to step S22 to transmit an infrared signal for commanding start of volume adjustment, from the infrared transmission section 124. In response thereto, an image indicating the current volume is displayed on the CRT 112 of the television 111 (processing of step S42 of FIG. 17 to be described later).

In step S23, the controller 121 calculates an amount of rotation applied to the remote controller 101 based on a notification from the gyro sensor 123, to determine whether or not it has exceeded a predetermined unit.

If having determined that the rotation equal to or above the predetermined unit is not calculated, the controller 121 goes to the processing of step S24 to determine whether or not the volume adjusting button 102 has been released.

If having determined in step S24 that the user has not released the volume adjusting button 102, the controller 121 returns to step S23, to repeat this and subsequent processing. Further, if having determined in step S24 that the user has released the volume adjusting button 102, the controller 121 returns to step S21, to repeat this and subsequent processing.

On the other hand, if having determined in step S23 that the rotation equal to or above the predetermined unit has been applied to the remote controller 101, based on the notification from the gyro sensor 123, the controller 121 goes to step S25.

In step S25, the controller 121 controls the infrared transmission section 124 to send out a volume adjustment signal for the television 111 as an infrared signal. For example, with the surface 101C facing the television 111, if it is assumed that it is set to "increase the volume by one unit" when a rotation is applied by a predetermined unit to the remote controller 101 in the rightward direction (clockwise direction) and, reversely, to "decrease the volume by one unit" when a rotation is applied by a predetermine unit in the leftward direction (counterclockwise direction), then the controller 121 sends out a volume adjustment signal instructing that the volume be increased or decreased by one level according to the rotation applied by the user.

Figure 17:
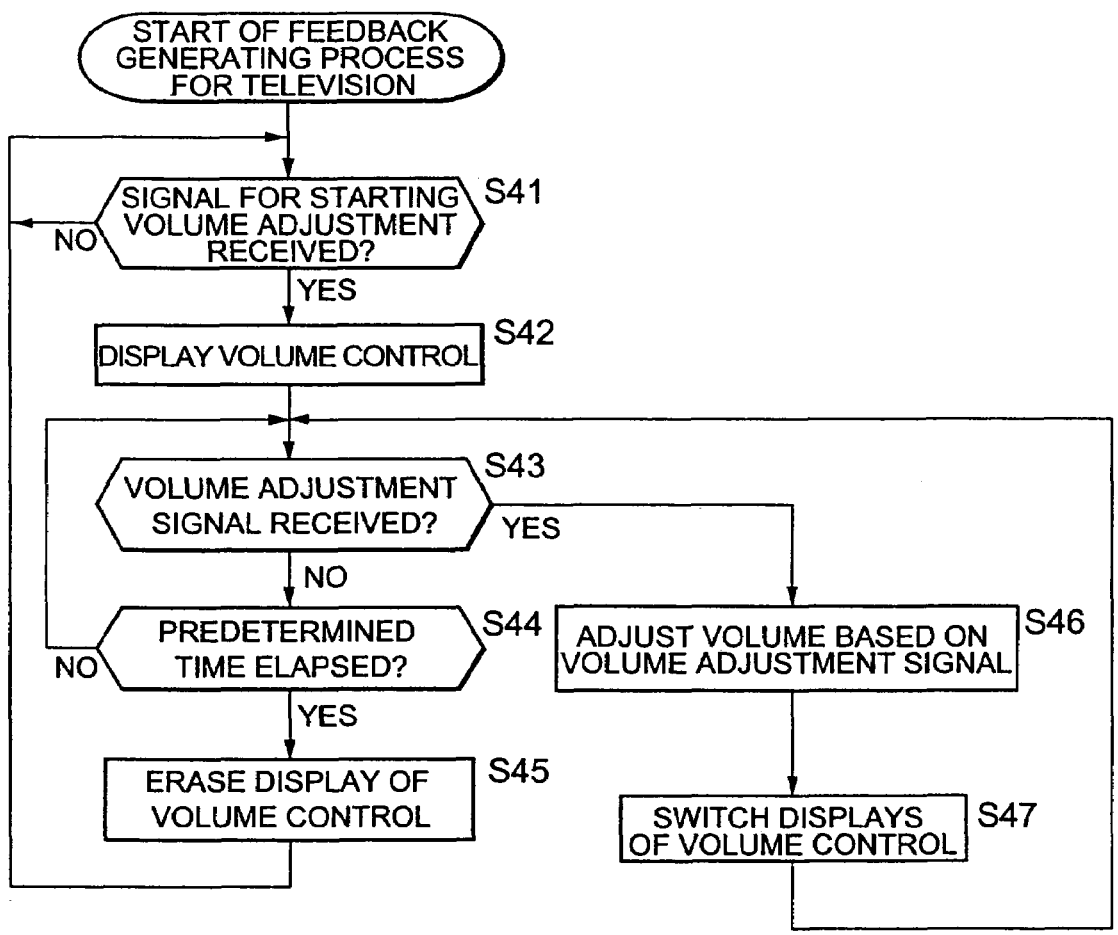
FIG. 17 is a flowchart illustrating a process of the television of FIG. 11.

The television 111 adjusts the volume according to this volume adjustment signal, and together therewith, changes the volume indication image displayed on the CRT 112 (processing of step S46 and step S47 of FIG. 17).

The controller 121 transmits the volume adjustment signal by the processing of step S25, and at the same time, controls the feedback generating section 125, in step S26, to generate a feedback to the user. For example, as shown in FIG. 13, if it is determined that a rotation is applied in the counterclockwise direction with the surface 101C facing the television 111, the driving section 131 applies a voltage to the coil 132 so as to move the shaft 133 in the right direction, to generate a feedback.

After that, the process returns to step S23, to repeat this and subsequent processing. That is, the user can adjust the volume in multiple levels, while depressing the volume adjusting button 102, and feel a sense of touch which is as if the user were turning a volume control every time the user adjusts the volume by one level.

Next, referring to FIG. 17, a process will be described, of the television 111 that adjusts the volume based on a signal from the remote controller 101.

In step S41, the controller 141 of the television 111 determines whether or not a signal for starting volume adjustment has been received by the infrared receiving section 115, and waits until it determines that the signal for starting volume adjustment has been transmitted from the remote controller 101 and received by the infrared receiving section 115.

If having determined that the infrared signal for starting volume adjustment has been transmitted from the remote controller 101, the controller 141 goes to step S42 to display a volume control on the CRT 112.

Figure 18:
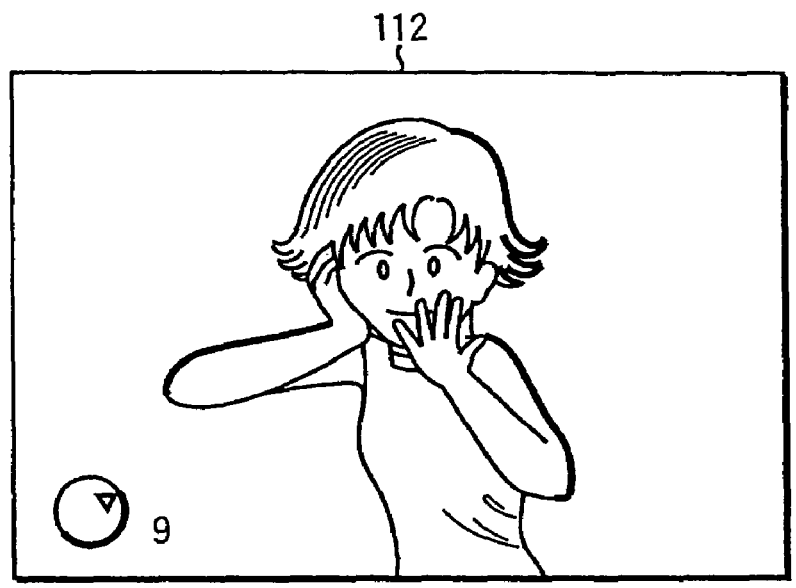
FIG. 18 is a diagram showing an exemplary display on the television of FIG. 11.

FIG. 18 is a diagram showing an exemplary display on the CRT 112 displayed by the processing of step S42. In this example, an image of a program which the tuner 142 is tuned to is displayed in the middle of the CRT 112, with the volume control at the left corner of the CRT 112 and a numeral ("9" in the case of the example of FIG. 18) representing the current volume level indicated by the control.

In step S43, the controller 141 determines whether or not the volume adjustment signal for actually changing the volume has been received by the infrared receiving section 115, and if having determined that the signal is not received, goes to step S44.

In step S44, the controller 141 determines whether or not a predetermined time has elapsed from the reception of the signal for starting volume adjustment, and if having determined that the predetermined time has not elapsed, returns to step S43, to repeat this and subsequent processing.

In step S44, if having determined that the predetermined time has elapsed from the reception of the signal for starting volume adjustment, the controller 141 goes to step S45, erases the image of the volume control displayed on the CRT 112, and thereafter returns to step S41, to repeat this and subsequent processing.

On the other hand, if having determined in step S43 that the volume adjustment signal for changing the volume has been received by the infrared receiving section 115, the controller 141 goes to step S46.

Figure 19:
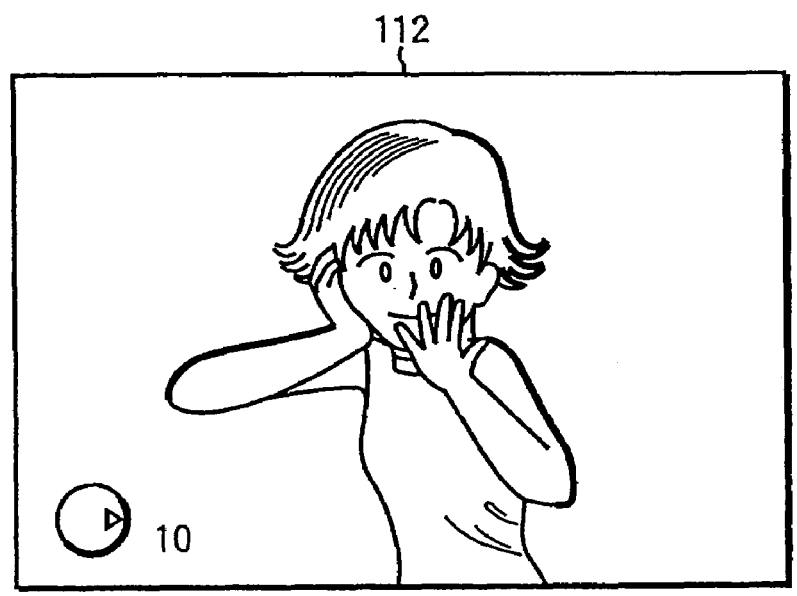
FIG. 19 is a diagram showing another exemplary display on the television of FIG. 11.

In step S46, the controller 141 adjusts the volume based on the volume adjustment signal transmitted from the remote controller 101. For example, in a case where the current display on the CRT 112 is such as shown in FIG. 18, when a volume adjustment signal instructing that the volume be increased by one level has been transmitted from the remote controller 101, the controller 141 increases the volume for output to the speakers 113A and 113B, by one level, and together therewith, the volume control is turned right one level and displays "10" which is a numeral indicating the current volume level, as shown in the exemplary display on the CRT 112 shown in FIG. 19.

After that, the process returns to step S43, to repeat this and subsequent processing.

In the above, a feedback is generated when the remote controller 101 is rotated by a predetermined amount. However, it may also be so designed that when the remote controller 101 is rotated by a predetermined amount, the corresponding signal is transmitted to the television 111 without feedback generation, and that when the television 111, in response to that signal, sets the volume to a predetermined value, a signal representing it is transmitted from the television 111 to the remote controller 101, and that when the remote controller 101 has received it, a feedback is generated. In that case, the infrared transmission section 124 of the remote controller 101 and the infrared receiving section 115 of the television 111 are constituted by infrared communication sections, respectively, each being capable of transmitting and receiving infrared signals.

Figure 20:
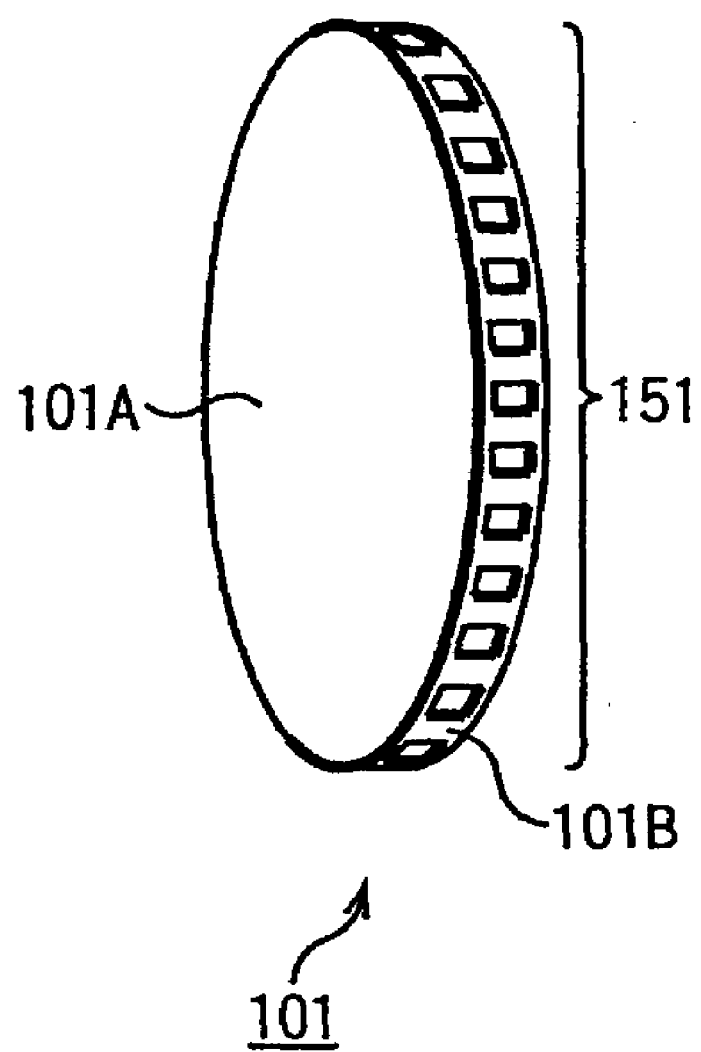
FIG. 20 is a diagram showing another external configuration of the remote controller to which the present invention is applied.

Further, while feedbacks which are as if a user were turning a volume control are generated by the coil 132, the shaft 133 and the like in the above, it may also be so designed that they are generated using various methods, such as by piezoelectric elements 151 as shown in FIG. 20, similar to the case of the above-described PDA 1.

In FIG. 20, the piezoelectric elements 151 are provided in array on the surface 101B, and when a user adjusts the volume by rotating the remote controller 101, the piezoelectric elements 151 are driven to generate a feedback which is as if the user were turning the volume control.

Note that in that case, the feedback generating section 125 shown in FIG. 12 is constituted by the piezoelectric elements 151 and a driving section that applies a voltage to each piezoelectric element 151.

While the present invention is applied to the PDA 1 and the remote controller 101 of the television 111 in the above, the present invention may be applicable to various other information processing terminals and input devices, as long as they touch the user's body.

INDUSTRIAL APPLICABILITY

As described in the foregoing, according to the present invention, a user interface with advantageous operability may be implemented.

The invention claimed is:

1. An information processing terminal held and used by user's hand, characterized by comprising:

execution means for executing a predetermined process;

displacement detection means for detecting a displacement of an attitude of a housing of said information processing terminal; and vibration generation means for generating vibration to said housing when said displacement of the attitude detected by said displacement detection means exceeds a predetermined value, wherein said displacement detection means detects an angular velocity with respect to a predetermined axis of said housing, and wherein said vibration generation means comprises a spindle that rotates to cancel the rotational angular velocity.

2. The information processing terminal according to claim 1, characterized by further comprising:

display means for displaying a plurality of items of information; and display switching means for switching said information displayed by said display means in addition to the vibrations generated by said vibration generation means.

3. The information processing terminal according to claim 2, characterized by further comprising instruction means for instructing execution of said information switched by said display switching means, wherein said execution means executes a process corresponding to said information instructed by said instruction means.

4. The information processing terminal according to claim 1, wherein said displacement detection means detects a displacement of a rotation with respect to a predetermined axis of said housing.

5. The information processing terminal according to claim 1, wherein said display switching means displays said information displayed by said display means in one of an enlarged and a reduced form.

6. The information processing terminal according to claim 1, wherein said vibration generation means is provided so as to project from said housing, and generates the vibrations transmitted to said user's hand which touches said housing.

7. The information processing terminal according to claim 1, characterized in that said information processing terminal comprises an input device of another information processing apparatus, and by further comprising transmission means for transmitting an instruction to said another information processing apparatus.

8. The information processing terminal according to claim 7, characterized by further comprising receiving means for receiving a signal from said another information processing apparatus, wherein said vibration generation means generates the vibrations to said housing according to said signal received by said receiving means.

9. An information processing method for an information processing terminal held and used by a user's hand, characterized by comprising:

an execution step for executing a predetermined process;

a displacement detection step for detecting a displacement of an attitude of a housing of said information processing terminal; and a vibration generation step for generating vibrations to said housing when said displacement of said attitude detected by processing of said displacement detection step exceeds a predetermined value, wherein said displacement detection step includes the step of detecting an angular velocity with respect to a predetermined axis of said housing, and wherein said vibration generation step includes the step of rotating a spindle to cancel the rotational angular velocity.

10. The information processing terminal according to claim 1 wherein said spindle rotates rapidly for a predetermined period of time.

11. The information processing terminal according to claim 10, wherein said spindle rapidly stops rotating after the predetermined period of time.

12. The information processing method according to claim 9, wherein said vibration generation step rotates said spindle rapidly for a predetermined period of time.

13. The information processing terminal according to claim 12, wherein said vibration generation step rapidly stops rotating said spindle after the predetermined period of time.

* * * * *